Nov. 6, 1951     C. E. SCHWENGER     2,573,775

INCANDESCENT LAMP FOR ASYMMETRICAL LIGHT DISTRIBUTION

Filed Feb. 13, 1948

Inventor
Charles E. Schwenger
by Douglas S. Johnson
Agent

Patented Nov. 6, 1951

2,573,775

UNITED STATES PATENT OFFICE 2,573,775

INCANDESCENT LAMP FOR ASYMMETRICAL LIGHT DISTRIBUTION

Charles E. Schwenger, Toronto, Ontario, Canada, assignor to Toronto Electric Commissioners, Toronto, Ontario, Canada Application February 13, 1948, Serial No. 8,094

2 Claims. (Cl. 313—113)

This invention relates to incandescent lamps and more particularly to an incandescent lamp for street lighting, and the principal object of the invention is to provide a simple form of incandescent lamp which without the use of separate reflector units or complex reflector systems will give a desired asymmetrical light distribution to provide an approach to substantially uniform illumination on the street or pavement areas and their verges providing the optimum useful distribution of light from the lamp filaments.

A further important object is to provide an extremely efficient and economical form of asymmetric incandescent lamp which will employ a standard form of envelope or bulb, greatly reducing cost and facilitating manufacture.

A still further important object is to provide an asymmetric incandescent lamp which will have a long life characteristic, reducing maintenance costs of a street lighting system.

The principal feature of the invention consists in providing an incandescent lamp having a pair of separate longitudinal light emitting filaments arranged in substantially parallel relation and providing a substantially elliptical distribution of the emitted light.

A further important feature consists in utilizing a standard form of glass envelope or bulb and coating the upper portion of the bulb with a light reflecting surface to reflect light directed upwardly from the filaments down upon the area to be illuminated.

Referring to the accompanying drawings, Figure 1 is an elevational view of an incandescent lamp embodying my invention.

Figure 1:
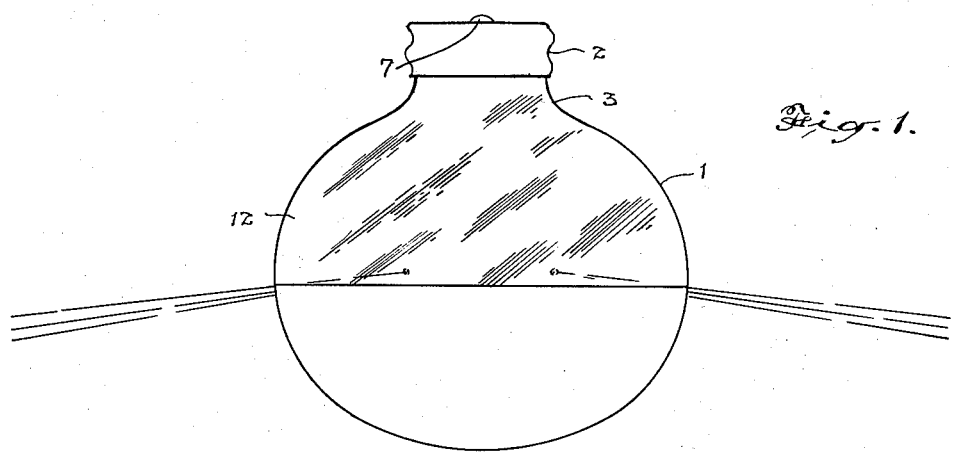

In lighting non-circular areas, such as streets and highways, the symmetrical or circular light distribution obtained with the normal incandescent lamp must be modified before any approach of uniformity of illumination over the pavement or street area can be obtained. Previous attempts to obtain an asymmetrical light distribution to provide uniformity of illumination in street light systems have incorporated the use of complex reflector units, greatly increasing the cost of the lighting installations and at the same time reducing the efficiency of the light source through absorption by the reflecting areas.

The present invention has therefore been devised to provide a light unit in the form of an incandescent lamp which will dispense with the necessity of the complex reflector units and at the same time provide an asymmetrical light distribution which will give the desired uniformity of illumination over the street area and its verges.

Since the illumination of the pavement or street as measured in horizontal foot candles varies as the cube of the cosine of the vertical angle of the light rays, it will be understood that the light from the incandescent source must be directed in main in the up-and-down street direction to provide the desired illumination at points remote from the lamp. On the other hand, limited concentrations of light rays in the across-the-street direction are required. Thus an elongated elliptical distribution of light from the source with the longitudinal axis of the ellipse coinciding with the up-and-down street direction will give the requisite illumination.

Referring to the accompanying drawings, it will be seen that my incandescent lamp or light includes an envelope or bulb 1 which is preferably spherical in shape and of the type normally used in the manufacture of incandescent lamps.

Extending downwardly from the threaded base 2 through the neck 3 of the envelope 1 is a post assembly 4 of vitreous or other suitable insulating material through which the conductors 5 and 6, which connect through the usual metal glass seal with the threaded portion of the base and the centre contact 7, extend.

Supported from the end of the insulating post assembly 4 by suitable insulated struts of resilient material 8 are a pair of longitudinal substantially straight light-emitting filaments 9 arranged in spaced substantially parallel relation. These filaments 9 are connected at one end to the conductors 5 and 6 and are connected at the opposite ends by a transverse conductor 10 supported by the resilient strut 11.

The filaments 9 are spaced either side of the vertical axis of the envelope and preferably slightly above the horizontal axis of the generally spherical bulb body and extend in a substantially horizontal plane across the central portion of the envelope but spaced either side of the physical envelope centre.

Since in street lighting upwardly directed light rays are lost for the purpose of providing illumination at the pavement areas, the upper portion of the envelope is silvered or provided with a reflecting coating indicated at 12, and this coating extends down to adjacent the horizontal axis or diameter of the envelope body. Thus the filaments 9 are located slightly above the base of the silvered portion or coating 12 and as illustrated in Figure 1, direct rays from the filaments passing beneath the edge of the coated surface are directed downwardly towards the area beneath the lamp.

By regulating the position of the filaments this angle, which is the cut-off angle for the lamp, can be adjusted as desired to accommodate the desired street-mounting condition. Light rays directed above this cut-off angle are reflected by the reflecting surface downwardly beneath the cut-off angle to provide useful illumination.

Figure 2:
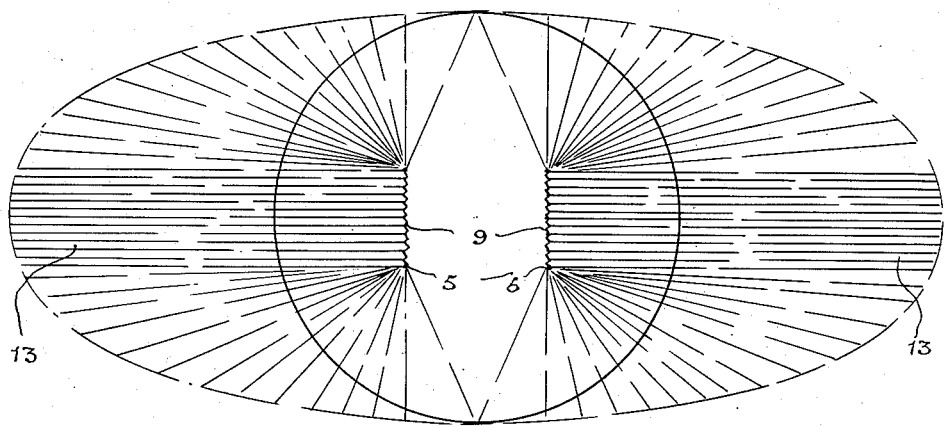
Figure 2 is a diagrammatic showing of the elliptical light distribution obtained with my lamp.
Figure 3:
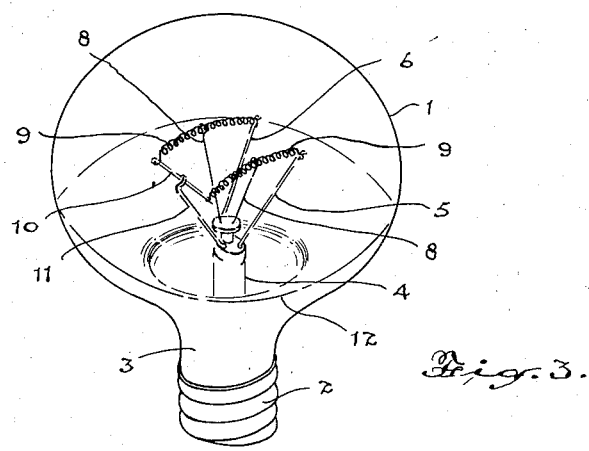
Figure 3 is a perspective view of the incandescent lamp of Figure 1.

Referring to Figure 2, it will be seen that the filaments 9, when raised to incandescence by a current flowing through the conductors 5 and 6, will concentrate light rays in a direction transverse to their length, while the rays directed between the transverse beams 13 and the direction in line with the filaments will become successively less concentrated corresponding to the projected length of the filaments at the angle considered.

Thus, as illustrated, substantially elliptical light distribution is effected, and if the lamp is arranged so that the filaments 9 extend in the across-the-street direction, the illumination will be concentrated in the up-and-down the street direction and will taper off to a minimum in the across-the-street direction, thus providing a very desirable approach to uniformity of illumination over the street area allocated to the lamp.

The use of the reflecting surface or coating 12 greatly increases the efficiency of the lamp, augmenting the illumination at the pavement.

It will be noted that with the filaments disposed on either side of the physical centre of the envelope body they are also disposed off the optical centre of the reflecting portion of the envelope and thus there will be no concentration of reflected rays from the one filament on the other filament, and the use of the reflecting surface will therefore not appreciably increase the temperature to which the filaments are raised and will not therefore impair the life of the filaments.

It will be understood that in the manufacture of the light or lamp, the post assembly 4, with the filaments arranged in proper relation, can be easily inserted through the neck of the standard bulb or envelope 1, and the bulb can be evacuated and sealed in the usual manner, enabling the lamp to be very economically manufactured.

In the particular illustrations shown the filaments 9 are connected in series through the conductors 5 and 6 and conductor 10. It will be understood however that the filaments may, if desired, be connected in parallel without departing from the nature of the invention.

In the usual installation the lamp is used in the inverted position, as illustrated in Figure 1, and in this position the "upper" coated portion 12 of the lamp comprises the portion adjacent the base. If however the lamp were used in an installation where it was not inverted, the silvered or reflecting areas would be changed to accommodate the particular installation.

While a particular form of envelope is shown as generally spherical, it will be understood that the shape of the envelope may be varied as desired, but for practical assembly the neck portion should be of a size to readily admit the filament-carrying assembly.

Thus it will be seen that the longitudinal parallel filaments will concentrate light in opposing transverse directions and the cut-off angle of the lamp can be varied by varying the relation of the filaments to the lower edge of the reflecting coating, providing a very desirable distribution of light without the use of extraneous light-reflecting devices or complicating reflecting systems, thus greatly reducing the cost of lighting installations.

In addition to the desirable light distribution obtained with the horizontally spaced filaments, their location either side of the optical centre of the reflecting surface of the envelope enables the reflecting surface to be used for increased lamp efficiency, while eliminating the problem of secondary heating through reflection and the separated filaments will therefore provide an incandescent lamp having an exceedingly long life, reducing maintenance costs in street lighting installations.

It will be understood that the problem of "fogging" of reflector elements which soon reduces the efficiency of street lighting installations where separate reflectors are used is dispensed with my use of the asymmetrical lamp, for when my lamp needs a replacement the new lamp will again provide maximum efficiency.

What I claim as my invention is:

1. An incandescent lamp for asymmetrical light distribution, comprising a base, a spherical evacuated envelope integral with said base, an inwardly reflecting coating covering the portion of said envelope adjacent said base, a pair of longitudinal light-emitting filaments supported within said envelope and spaced symmetrically either side of the physical and optical centre of said envelope and out of the path of any ray concentrations reflected from said coating to prevent secondary heating of said filaments, and conductors leading from said filaments through said base to permit the passage of an electric current through said filaments to raise said filaments to incandescence, said filaments being substantially parallel and each being coplanar throughout its length forming a substantially point light source directing light in the direction of its length and forming a longitudinal light source directing a maximum of light right angularly of its length whereby said filaments provide an elliptical light distribution.

2. An incandescent lamp for asymmetrical light distribution comprising a base, an evacuated spherical envelope extending from said base, an inwardly reflecting surface covering the portion of said envelope adjacent said base, a pair of longitudinal light-emitting filaments supported within said envelope either side of the vertical axis thereof in spaced substantially parallel relation spaced symmetrical with respect to the physical and optical centre of said spherical envelope and clear of the path of any ray concentrations reflected from said reflecting surface to prevent secondary filament heating, and conductor means leading from said filaments through said base to permit the passage of electric current through said filaments to raise said filaments to incandescence, said filaments each being coplanar throughout its length and emitting a minimum of light in the direction of its length and a maximum of light in the direction transverse of its length to provide an elliptical light distribution.

CHARLES E. SCHWENGER.

REFERENCES CITED

The following references are of record in the file of this patent:

UNITED STATES PATENTS

| Number | Name | Date |
|---|---|---|
| 1,804,049 | Clauss | May 5, 1931 |
| 2,368,685 | Singer | Feb. 6, 1945 |